(12) United States Patent
Rajagopalan et al.

(10) Patent No.: US 8,712,841 B1
(45) Date of Patent: Apr. 29, 2014

(54) INCENTIVE BASED RECOMMENDATION METHOD FOR MOBILE STATION CONTENT

(75) Inventors: Padmanabha D. Rajagopalan, Bridgewater, NJ (US); Lavanya Ramanujam, New Providence, NJ (US); Ioannis Tsampalis, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 686 days.

(21) Appl. No.: 12/947,577

(22) Filed: Nov. 16, 2010

(51) Int. Cl.
*G06Q 30/00* (2012.01)
*G06Q 30/02* (2012.01)

(52) U.S. Cl.
CPC .................................. *G06Q 30/0214* (2013.01)
USPC ....................................................... 705/14.16

(58) Field of Classification Search
CPC ................................................ G06Q 30/0214
USPC .................................................. 705/14.16, 14
See application file for complete search history.

(56) References Cited

U.S. PATENT DOCUMENTS

| 2008/0320139 | A1* | 12/2008 | Fukuda et al. | 709/226 |
| 2012/0109728 | A1* | 5/2012 | Sparks | 705/14.16 |
| 2012/0123838 | A1* | 5/2012 | Sparks | 705/14.16 |

* cited by examiner

*Primary Examiner* — John G Weiss
*Assistant Examiner* — Michael Stibley (57) ABSTRACT

An application store provides an incentive based recommendation method for recommending a mobile station content item. A user of a first mobile station recommends the mobile station content item to a second user. The application store distributes the recommendation through a mobile communication network to a mobile station of the second user. The application store stores information associated with the recommendation and detects access of the mobile station content item by the second user. In response to the detected access, the application store provides a reward to the first user based on the stored information.

18 Claims, 5 Drawing Sheets

INCENTIVE BASED RECOMMENDATION METHOD FOR MOBILE STATION CONTENT

TECHNICAL FIELD

The present discussion relates to techniques and equipment to incentivize mobile device users to recommend mobile device related content to other mobile device users.

BACKGROUND

In recent years, mobile communication services have expanded and increased in popularity around the world. Many advanced networks offer wireless mobile communication service for voice calls, mobile messaging services (e.g. text and/or multimedia) and data communications. The data services, for example, enable surfing the world wide web, e.g. via a browser. The speeds of the data communications services have steadily increased as service providers have migrated the networks to newer generation technologies with broadband data communication capabilities, and the mobile stations have steadily advanced to take advantage of the new network technologies. The data communication capabilities of the mobile stations and the broadband data communication services offered by the networks enable users to perform more and more tasks from their mobile stations.

Shopping has also evolved with the evolution to telecommunications technologies. On-line shopping is now commonplace, and increasingly, users can do their on-line shopping using their mobile stations. On-line shopping may be for content for downloading to the mobile device (e.g. text, video, audio or mixed multimedia) or a product or service related to the mobile station, such as an application program ("app"), for installation in the mobile station. Examples of mobile station content items include, without limitation, media, games, messaging, social networks, stores, and any other application for use on or with a mobile device, for example a smartphone or PDA. In any purchase, a recommendation from a friend is a particularly strong way to influence a purchase decision. While users may discuss particular mobile station content items with friends, it is difficult to ascertain quickly the mobile station content items that friends actually have downloaded or purchased. Further, the incentive for users to recommend a mobile station content item to their friends is limited.

Hence, a need exists for an improved method of distributing recommendations, for example, which provides a user with an incentive to provide other users or potential customers with recommendations as to which a mobile station content items to download.

SUMMARY

The teachings herein alleviate one or more of the above noted problems by providing an incentive based recommendation method for encouraging the adoption of a mobile station content item of additional users.

Such a method may include the steps of distributing a recommendation from a first mobile station, through a network, to a second mobile station, storing information related to the recommendation, and detecting access of the recommended item by the second mobile station. The methodology also provides a reward to the user of the first mobile station, in response to the detected access to the recommended item by the second mobile station.

The reward for the recommending user, upon access by the second station (party to whom the first user recommended the content), incentivizes the first user to make recommendations. In one example, before distributing the recommendation, a reward may be offered to the user of the first mobile station as an incentive to recommend one or more items to other mobile station users.

In some examples, the user of the second mobile station may provide a recommendation to the user of a third mobile station in a similar manner, with rewards provided to both the first user and the second user for such recommendation. The reward(s) may be in the form of a discount on the price of a subsequently purchased mobile station content item.

The application store may associate the recommendations via a user recommendation table, an application content description table, and a user account tracking table.

As a result of the disclosed method, a user can learn about mobile station content items downloaded by friends via recommendations. The user can also earn rewards by recommending the mobile station content items to other users. Additionally, application stores can use viral marketing to alert customers and potential customers about new mobile station content items to download. Further, developers of mobile station content items may benefit from increased exposure and improved tracking of downloads.

Other concepts relate to unique systems and software for implementing the techniques to incentivize a mobile device user to recommend mobile device related content to another mobile device user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The detailed description below relates to distributing recommendations of wireless users so that other users can learn about mobile station content items. A user recommends a mobile station content item to other users connected to the user via social network, contact list, connected communities, or any other relation. The user then receives a reward, such as a credit, coupon, or rebate. In one example, the user is given a choice to recommend a mobile station content item to other users when purchasing, upgrading, or exiting a mobile station content item. Alternatively, or additionally, the user has a choice to recommend a mobile station content item via a menu option. After choosing to make a recommendation, the user chooses one or more other users by selecting friends connected to the user, or by entering phone numbers, names, or other identifying information of the friends into the user's mobile station. The other users then receive a notification via their respective mobile station(s) of the recommendation via a mobile station messaging service message containing credentials of the first user. When the recommended user (user who received the recommendation) tries and purchases and/or downloads the mobile station content item, the first user receives a reward. The recommended users may then make recommendations in a similar fashion, and be rewarded similarly upon the trial, purchase and/or download the mobile station content item. Additionally, the original user may be rewarded when the friend of a friend tries and purchases and/or downloads the mobile station content item.

Figure 1A:
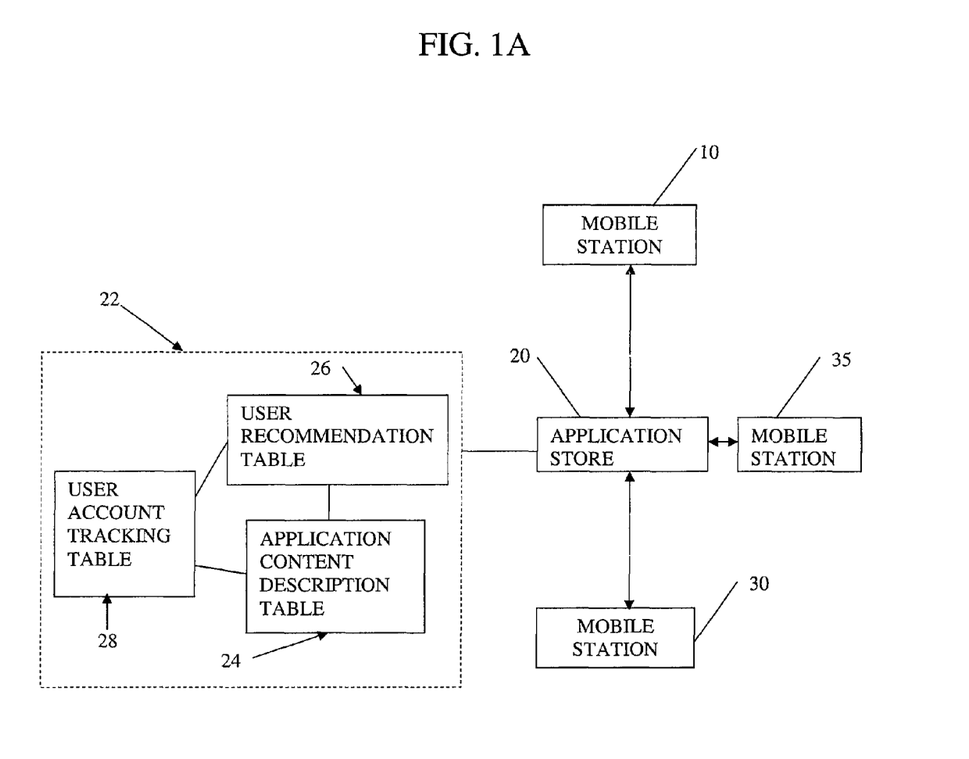
FIG. 1A is a block diagram of an exemplary system for implementing a recommendation method, for example, for providing recommendations regarding a mobile station content item for downloading to mobile devices.

Reference now is made in detail to the examples illustrated in the accompanying drawings and discussed below. FIG. 1A illustrates one example in which a first mobile station 10, a second mobile station 30, and a third mobile station 35 communicate with an application store 20. Each of the mobile stations 10, 30, 35 may be a mobile device, personal computer, laptop, tablet, or other suitable device for accessing and displaying information from the application store 20 or similar interface. The first mobile station 10 communicates with the application store 20 to transmit and receive information from the application store 20. Likewise, the application store 20 communicates with mobile stations 30, 35 of respective second and third users to transmit and receive information from the mobile stations 30, 35. The mobile station 10, application store 20, and the mobile stations 30, 35 communicate over a mobile network, the Internet, one or more intranets, or a combination thereof (see e.g., FIG. 3 discussed below). As shown in FIG. 1A, the mobile station 10 communicates directly with an application store 20 and indirectly with the mobile stations 30, 35 via the application store 20. The application store 20 communicates directly to the mobile stations 10, 30, 35.

The application store 20 may take the form of a website, intranet site, mobile network site, or other suitable on-line interface for displaying, interacting with, and allowing a user to purchase and/or download mobile station content items. The application store 20 may be a number of sites or interfaces running on various server hardware platforms in communication with each other. Each site may run on one server or a group of server accessible via communication network. The application store 20 may also include an application catalogue that stores the product information and various other information utilized by the application store 20 to offer various applications and/or other mobile station content items to users. In one example, the mobile stations 10, 30, 35 include software or programming to access the application store 20 and display information received therefrom.

The application store 20 may be stored and operational from a server or other suitable device or combination of devices suitable for maintaining a database, storing the appropriate information and communicating with mobile stations 10, 30 and other suitable interfaces and devices. The database may take the form of a number of databases communicating with each other.

Figure 1B:
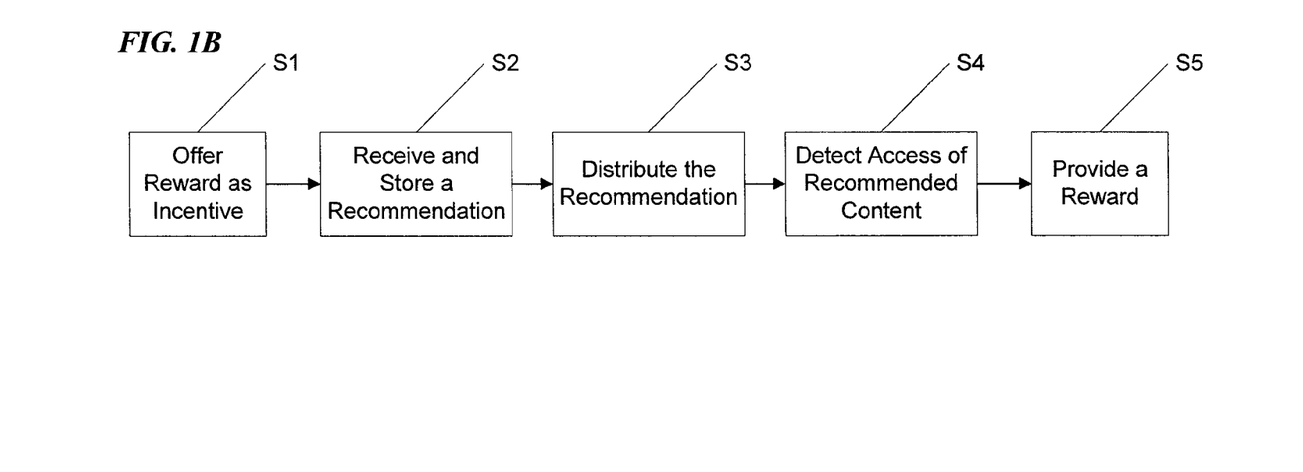
FIG. 1B is a flow chart of an exemplary method for providing recommendations regarding a mobile station content item for downloading to mobile devices.

Referring now to FIG. 1B, at step S1, the application store 20 offers a reward to the user of the mobile station 10 as an incentive to recommend one or more content items to one or more other mobile station users. In order to be rewarded for recommendations, the user opens an account with the application store 20. The user's phone number is tagged as an identifier to the account number, which serves as a unique identifier for tracking purposes throughout backend system 22. When the user makes a recommendation, the mobile station 10 transmits a message to a backend system 22 of the application store 20, identifying the mobile station content item and the second user of a mobile station 30 to whom the user of the first mobile station 10 intends to recommend the mobile station content item.

Figure 2:
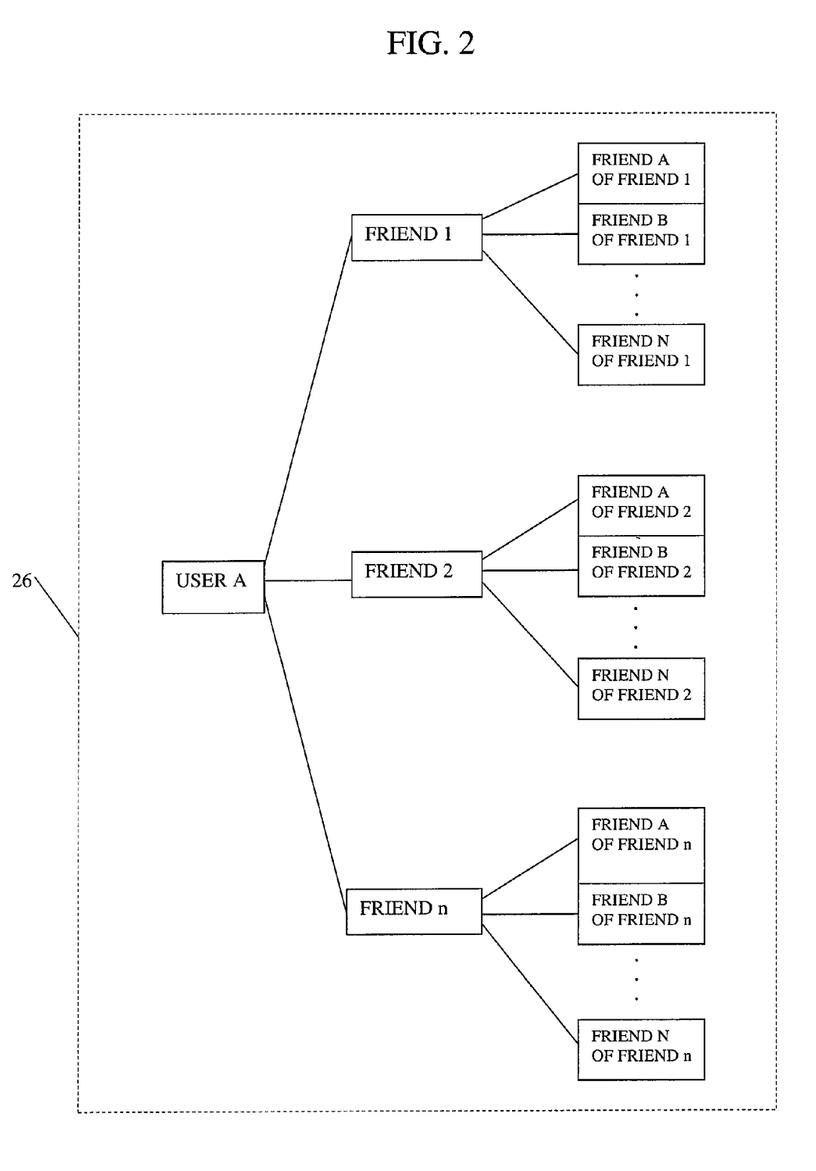
FIG. 2 is a high level block diagram of exemplary content and relationships of a first user and other users in a user recommendation table.

At step S2, the backend system 22 of the application store 20 receives and stores information identifying the recommended mobile station content item and the second user in a record associated with the first user. In a similar fashion, when the second user makes a recommendation, the backend system 22 of the application store 20 stores information identifying the recommended mobile station content item and a third user in a record associated with the second user, as well as in a record associated with the first user. Within the backend system 22 of the application store 20, the record(s) are stored in a user recommendation table 26. For example, the user recommendation table 26 may include relationships between friends and corresponding account information, as illustrated in FIG. 2. The user recommendation table 26 associates the recommendation from the first user with an identifying number for the first user and an identifying number for the second user. As indicated above, the identifying number is assigned to the first user upon enrollment in the incentive program and is associated with the mobile number of the first user. Likewise, the second user may be represented in the database by mobile number or other identifying number associated with the mobile number of the second user.

At step S3, the application store 20 distributes a mobile station messaging service message (e.g., conforming to a protocol such as SMS, EMS, MMS) containing the recommendation of the mobile station content item from the first user, through a mobile communication network 40 (described with respect to FIG. 3 below) to the mobile station 30 of the second user. The mobile station messaging service message identifies the first user and contains a link to the recommended mobile station content item. The link contains credentials of the first user's account. When the second user uses the link to purchase the mobile station content item, at step S4, a communication is sent from the market server to the backend system 22 of the application store 20 indicating the purchase was based on the recommendation of the first user. Thus, the backend system 22 of the application store 20 detects access of the recommended mobile station content item by the mobile station 30 of the second user. At step S5, in response to the detected access by the second user, a reward may be provided to the user of the first mobile station 10. In a similar fashion, a recommendation of a mobile station content item may be distributed from the user of the second mobile station 30 to a third user having a third mobile station 35. The backend system 22 of the application store 20 can then detect access of the recommended mobile station content item by the mobile station 35 of the third user. In response to the detected access by the third user, a reward may be provided to the users of the first and second mobile station 10, 30.

Referring to FIG. 2, the user recommendation table 26 is associated with each mobile station content item and provides information on the "chain" of recommendations. An example of a subset of information stored in a backend system 22 of the application store 20 is illustrated, in which recommendations of a user and subsequent recommendations of the user's friends are established within the database. Of course, more than two degrees of separation may be established in the database, such as for example, three degrees of separation, i.e., friends of friends of friends, depending on the limitations of the backend system 22. For example, the user recommendation table 26 may indicate that the first user (User A) recommended to three other users (Friend 1, Friend 2, Friend n) who each recommended to three more users (Friend A of Friend 1, Friend B of Friend 1, Friend N of Friend 1, etc.). Thus, when a friend of a friend purchases a mobile station content item, the user recommendation table 26 is referenced and allows for a credit or other reward to flow back to the first user (along with the corresponding intervening recommending user). In this manner, recommendations can grow in an expanding (or "viral") manner.

The value of the reward may vary between the first user and the second user and between the second user and the nth user. For example, the first user may get double credit when providing a recommendation to a second user who in turn provides a recommendation to a third user. Likewise, the value of the reward may vary depending on whether the end user downloads a trial version, or purchases a full version of the mobile station content item. The expiration of the reward may be predetermined by the application store 20, based on limitations on the backend system 22 to maintain the information, or other factors. Additionally, limits on the number and/or value of credits earned for recommendations of a particular mobile station content item may be limited based on terms set by the application store 20, which may be limited by limitations of the backend system 22. Further, limits on the number and/or value of credits redeemed in a subsequent purchase may be limited based on terms set by the application store 20.

Referring again to FIG. 1A, the backend system 22 of the application store 20 may store information about mobile station content identifiers, descriptions, prices, and reward values for recommendations, in an application content description table 24. The application content description table 24 is used in conjunction with the user recommendation table 26 to determine the appropriate award to be noted in the user account tracking table 28. The application content description table 24 includes identifying information about the mobile station content item, such as price and reward value, along with expiration of the reward. Additionally, the application content description table 24 may store information related to the total number of times a particular mobile station content item has been accessed. Thus, developers of mobile station content items may be compensated according to popularity of their mobile station content items, potentially resulting in a bigger developer community.

The backend system 22 of the application store 20 stores information about the earned rewards of each user in a user account tracking table 28. Such information may include user account numbers and reward information, such as value and expiration of earned credits. The information regarding recommendations and reward information associated with friends is communicated to the application store 20 or similar interface once the mobile station content item is downloaded or purchased and operational. For example, the information regarding the particular recommendation may be communicated from the point-of-purchase, such as a retail outlet or website, from other network devices, such as servers, which receive and store the information for other purposes, or from the device, itself, upon registration with a mobile network. The user account tracking table 28 references the user recommendation table 26 and the application content description table 24, and, when appropriate, indicates a credit is due. The credit is added to a recommendation credit balance (which is initially $0.00) and stored in a record associated with the first user in the user account tracking table 28. The credit balance is debited when the user applies all or a portion of the credit to a later purchase from the content store.

A mobile station messaging service message, or other notification containing an indication of the recommendation credit balance, may be sent through the mobile communication network 40 to the mobile station 10 of the first user. Such notifications may be sent to the user any time the user account tracking table 28 is updated, or notifications may be sent based on other triggers. For example, the user may opt to subscribe for updates when the recommendation credit balance meets a certain threshold value, when credits are near expiration, or periodically based on a predetermined passage of time (e.g., weekly or monthly).

When the first user subsequently makes a purchase, the application store 20 detects access of the second mobile station content item desired for purchase by the mobile station 10 of the first user. In response to this detected access, the application store 20 refers to and receives stored information from the user account tracking table 28 for the recommendation credit balance associated with the user. The application store 20 then communicates the recommendation credit balance to the mobile station 10 of the first user and discounts a price of the second mobile station content item by the recommendation balance. The user may have the option to accept the discounted price, or refuse to apply the credit. If the credit is accepted by the user, it is deducted from the recommendation credit balance in the user account tracking table 28. Multiple credits may be stored in user account tracking table 28 at any given time.

In an exemplary operation, a first user enters the application store 20 via a mobile station 10, such as their currently owned mobile device or computer. The application store 20 prompts the user whether they would like to join the incentive program. Upon affirmation by the user to join the incentive program, one or more contact lists of the user are obtained from the terminal. The contact lists are preferably in the form of mobile numbers. The user then reviews the received lists and selects which friends to provide with a recommendation.

Once the user selects other users for a recommendation, the mobile station 10 transmits the other users' information for inclusion in the user recommendation table 26 of the backend system 22 of the application store 20. In response to terminal transmission of recommendations by the user, the application store 20 communicates with a mobile station 30 of another user to display a list of applications or other mobile station content items that his/her friend has recommended for trial, download and/or purchase. The application store 20 may also communicate other information regarding applications or other mobile station content items, such as a product description, ratings, comments, and other information related to the application. The information regarding recommendations may be communicated to the mobile station 30 by the application store 20 via suitable channels of remote data communication.

Once the mobile station 30 receives a communication from the application store 20, the secondary user may choose to try, purchase and/or download the recommended mobile station content item. The mobile station 30 then transmits information to the backend system 22 of the application store 20 for inclusion in the user account tracking table 28. The application store 20 transmits information from the user account tracking table 28 to the mobile station 10 such that the appropriate reward is applied. In response to detecting access of the recommended mobile station content item by the mobile station 30 of the second user, the application store 20 provides a reward to the user of the first mobile station 10, based on information stored in the backend system 22 of the application store 20. In a similar fashion, in response to detecting access of the recommended mobile station content item by the mobile station 35 of a third user, the application store provides a reward to the users of the first mobile station 10 and the second mobile station 30.

The application store 20 may be implemented as server programming on a network connected hardware platform of one or more computer systems. A client application for managing a user's recommendations may also be provided as an application executable on each of the mobile stations 10, 30, 35. The client application allows the user to manage recommendations by, for example, adding, modifying, editing, and deleting recommendations and/or contacts.

The backend system 22 may run as an application on the same computer system(s) that implement the application store 20, or the backend system 22 may be implemented by appropriate programming on a separate computer system. The server implementation of the application store 20 has an interface for communication with mobile stations 10, 20 through the mobile communication network 40 (described with respect to FIG. 3). A processor of the appropriate computer system may control operations of the server of the application store 20, including communications through the interface. The system storage may store user records, the store catalog and any other programming or information needed to implement the on-line mobile content storage, e.g. in the computer system running programming to function as the backend system 22.

The programming for the application store 20 and the backend system 22 may be executable by the processor(s) and may configure the processor(s) so that the overall system is capable of implementing the functions of the application store 20 and the backend system 22.

Figure 1C:
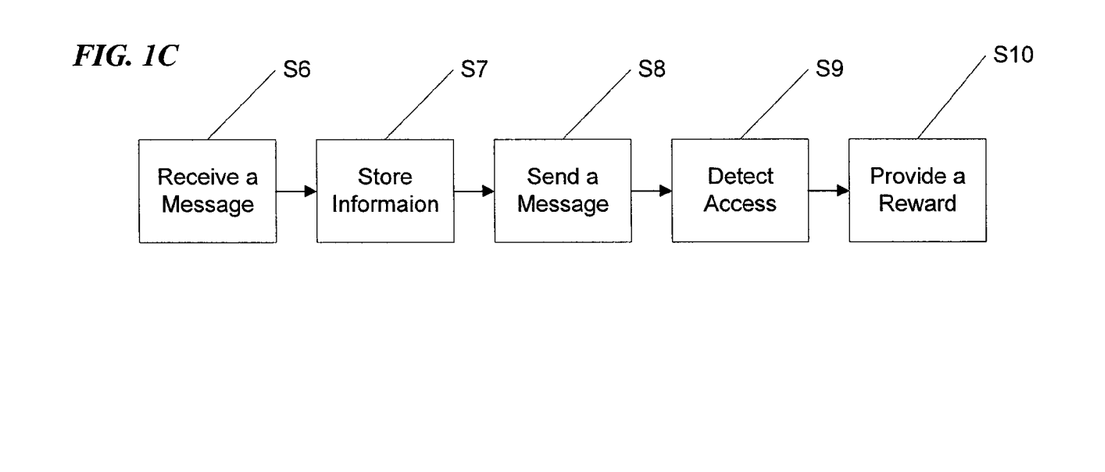
FIG. 1C is a flow chart of another exemplary method for providing recommendations regarding a mobile station content item for downloading to mobile devices.

Referring now to FIG. 1C, at step S6, the programmed functions may allow the system to receive from the user of the first mobile station 10, a message identifying a mobile station content item and second user of a mobile station 30 to whom the user of the first mobile station 10 intends to recommend the mobile station content item. The functions may additionally allow the system to store information identifying the recommended mobile station content item and the second user in a record associated with the first user, in the storage, as illustrated at S7. The functions may further allow the system to send a mobile station messaging service message, containing a recommendation of the mobile station content item from the first user, through the mobile communication network 40 to the mobile station 30 of the second user at S8. The functions may allow the system to detect access of the recommended mobile station content item by the mobile station 30 of the second user at S9, and responsive to the detected access, provide a reward at S10 to the user of the first mobile station 10, based on the stored information. The process may be repeated for additional users, such as a third user, with the method including steps of providing a reward to the user of the first mobile station and providing a reward to the user of the second mobile station.

To appreciate the application of the above-discussed recommendation methods and devices, it may be helpful to consider the context of an exemplary system of networks as well as the hardware and software of an exemplary mobile station device, as may be involved in implementing the above described methods and systems. The mobile stations 10, 30, 35 will be discussed later with regard to FIG. 4.

Figure 3:
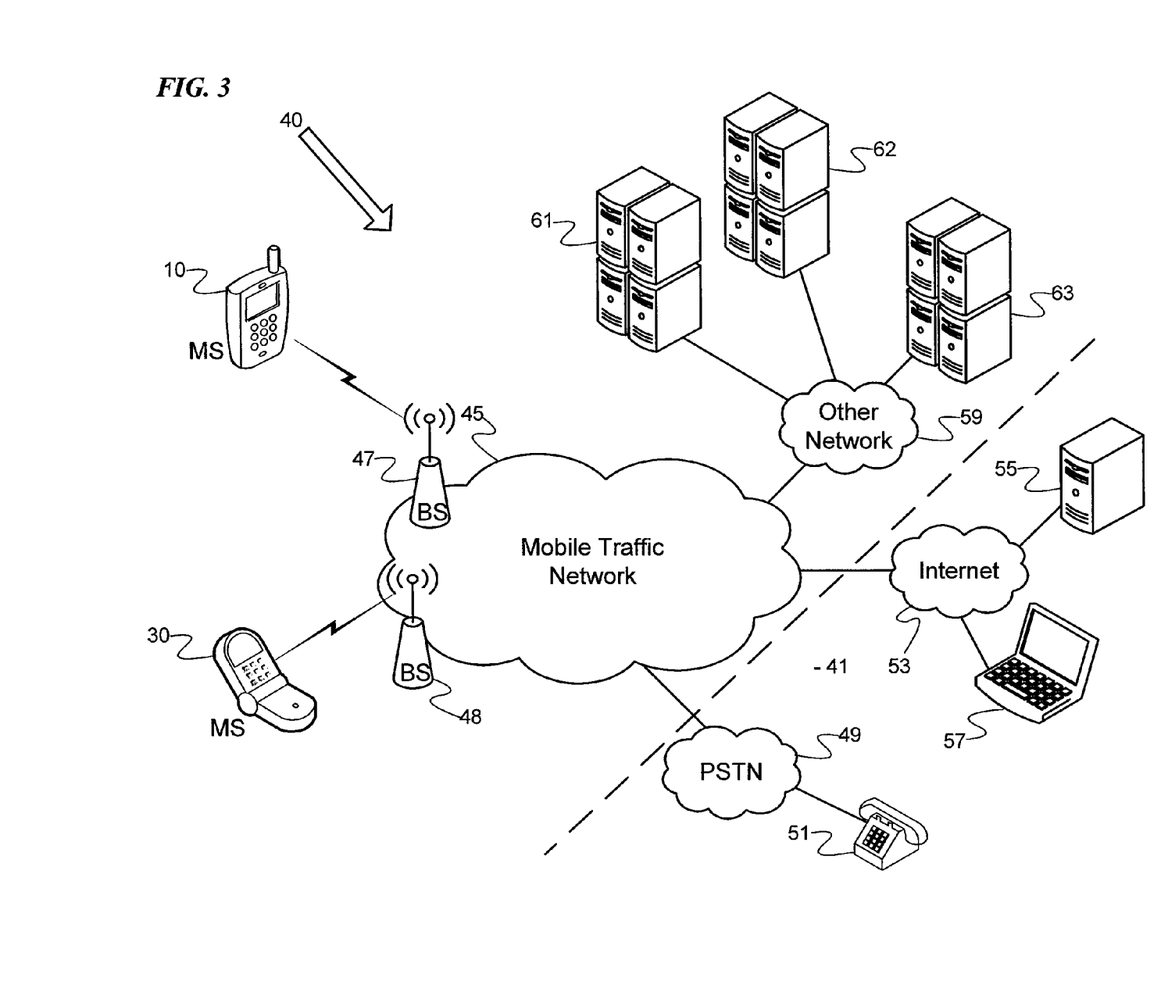
FIG. 3 is a high level functional block diagram, useful in explaining mobile stations, network elements and other components that may be involved in marketing of mobile station content items.

FIG. 3 is a functional block diagram of an exemplary system of a wireless network for providing mobile voice telephone services and various data services. For discussion purposes, the diagram shows a mobile communication network 40. The mobile communication 40 may be operated by wireless service providers, carriers or operators. The mobile communication network 40 implementing the illustrated system provides mobile voice telephone communications as well as other services such as text messaging and various multimedia packet data services, for numerous mobile stations. As illustrated, two mobile stations 10, 30 are present. The elements indicated by the reference numeral 10 generally are elements of a respective operator's network, although the mobile stations 10, 30 may be sold to the carrier's customers. Today, mobile stations 10, 30 may take the form of portable handsets, smart-phones or personal digital assistants, data cards for computers, although they may be implemented in other form factors. The mobile communication network 40 provides communications between mobile stations 10, 30 as well as communications for the mobile stations 10, 30 with other networks and stations shown generally at 41 outside the mobile communication networks. A network 59, such as an inter-carrier, intranet, or other intermediate network, may provide communication connectivity between the mobile communication network 40 and servers 61, 62, 63.

The mobile communication network 40 allows users of the mobile stations 10, 30 operating through the respective network to initiate and receive telephone calls to each other as well as through the public switched telephone network (PSTN) 49 and telephone stations 51 connected thereto. The network may offer a variety of text and other data services, including services via the Internet 53, such as downloads, web browsing, e-mail, etc. via servers shown generally at 55 as well as message communications with terminal devices represented generally by the personal computer 57.

The mobile communication network 40 may be implemented by a number of interconnected networks. Hence, the mobile communication network 40 may include a number of radio access networks (RANs), as well as regional ground networks interconnecting a number of RANs and a wide area network (WAN) interconnecting the regional ground networks to core network elements. A regional portion of the mobile communication network 40, such as that serving mobile stations 10, 30 may include one or more RANs and a regional circuit and/or packet switched network and associated signaling network facilities.

Physical elements of a RAN operated by one of the mobile service providers or carriers include a number of base stations represented in the example by the base stations (BSs) 47, 48. Although not separately shown, such base stations 47, 48 may use a base transceiver system (BTS) which communicates via an antennae system at the site of base stations and over the airlink with one or more of the mobile stations 10, 30, when the mobile stations 10, 30 are within range. The BTS is the part of the radio network that sends and receives RF signals to/from the mobile stations 10, 30 that the base station currently serves. For example, each base station 47, 48 will broadcast certain standardized information to allow a mobile station 10, 30 in the region to search for, find and lock-onto the base station 47, 48 and acquire information needed to register and initiate communications via the mobile communication network 40.

The radio access networks also include a mobile traffic network represented generally by the cloud at 45, which carries the user communications for the mobile stations 10, 30 between the base stations 47, 48 and other elements with or through which the mobile stations 10, 30 communicate. Individual elements such as switches and/or routers forming the mobile traffic network 45 are omitted here for simplicity. Although not separately shown, the mobile traffic network 45 will include or connect with a number of service control elements, for authenticating mobile stations 10, 30 to use the mobile communication network 40, for authenticating mobile device users and/or for authorizing users or devices to access various services and service features offered by the particular mobile communication network 40, and for usage accounting and billing functions.

The mobile traffic network 45 portion of the mobile communication network 40 connects to a public switched telephone network (PSTN) 49. This allows the mobile communication network 40 to provide voice grade call connections between mobile stations 10, 30 and regular telephones connected to the PSTN 49. The drawing shows one such telephone at 51. The mobile traffic network 45 portion of the mobile communication network 40 also connects to a public packet switched data communication network, such as the network commonly referred to as the "Internet" shown at 53. Packet switched communications via the mobile traffic network 45 and the Internet 53 may support a variety of user services through the mobile communication network 40, such as mobile station 10, 30 communications of text and multimedia messages, e-mail, web surfing or browsing, programming and media downloading, etc. For example, the mobile stations 10, 30 may be able to receive messages from and send messages to user terminal devices, such as personal computers, either directly (peer-to-peer) or via various servers 55. The drawing shows one user terminal device as a personal computer (PC) at 57, by way of example.

The carrier or service provider that operates the mobile communication network 40 will also operate a number of systems that provide ancillary functions in support of the communications services provided through the mobile communication network 40, and those elements communicate with other nodes/elements of the mobile communication network 40 via one or more private IP type packet data networks or Intranets (not separately shown). Such systems maintain various records used for authentication and authorization functions and provisioning necessary information into the mobile stations 10, 30 to enable their operation via the mobile communication network 40.

For purposes of the present discussion of methods and equipment for offering recommendations to other users, in one example, the application store 20 and the mobile stations 10, 30 may communicate with each other via network 59 supported by the carrier or service provider via mobile communication network 40. In another example, the application store 20 may be stored and run from servers 61, 62, 63 and/or 55. For example, if the network operator also operates the application store 20, the server/computer 61 might perform the functions of the application store 20, the server 62 might perform the functions of the backend system 22, and the server 63 might be configured as an SMS, EMS or MMS type messaging center for storing and forwarding messages to and from the mobile stations, including messages relating to content item recommendations and rewards.

The application store 20 and the mobile stations 10, 30 may communicate with each other via the Internet 53 and/or network 59 and the mobile traffic network 45. The application store 20 may also communicate with mobile stations 10, 30 directly via the mobile traffic network 45. In this example, servers communicating directly with the mobile traffic network 45 and mobile stations 10, 30 store and run the application store 20. These servers may also communicate with the Internet 53 and network 59. These systems may support downloading of any executable programming including, for example, programming for obtaining users' contact lists, client applications for managing a social network, and applications and/or other mobile station content items downloaded from the application store 20. If desired, one or more of the servers may enable downloading of the client programming to the mobile stations, e.g. to install or upgrade a shopping client program configured to help facilitate the application store related functions.

In a further example, the application store 20 may be hosted on an Internet site. In this example, the application store 20 may communicate with the mobile stations 10, 30 via the Internet 53 and mobile communication network 40. Of course, various permutations and examples of the communication structure of the mobile stations 10, 30, and application store 20 may be evident from the present discussion.

Figure 4:
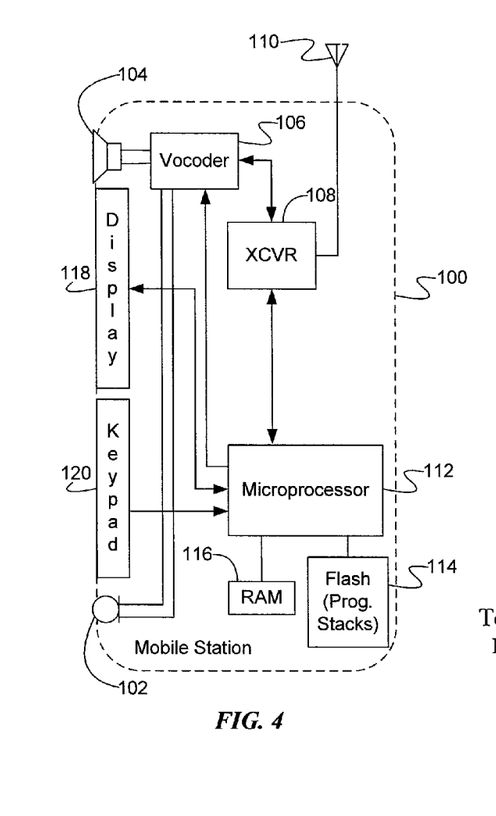
FIG. 4 is a high level functional block diagram of a handset type example of a mobile station.

FIG. 4 provides a block diagram illustration of an exemplary wireless device 100, which may be the mobile station 10, 30 of a user of the network operators. Although the wireless device 100 may be a smart-phone or may be incorporated into another device, such as a portable personal computer, personal digital assistant (PDA) or the like, for discussion purposes, the illustration shows the wireless device 100 in the form of a handset. The handset version of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The transceiver 108 provides two-way wireless communication of information, such as vocoded speech samples and/or digital message information. The transceiver 108 also sends and receives a variety of signaling messages in support of the various voice and data services provided via the station 100 and the communication network (described earlier with regard to FIG. 3). The transceiver 108 connects through RF send and receive amplifiers (not separately shown) to an antenna 110. In the example, the transceiver 108 is configured for RF communication in accord with a digital wireless protocol. For the recommendation method described herein, network communications via the transceiver 108 and antenna 110 will include transmitting recommendations to the application store 20, visiting and interacting with an application store 20, and managing recommendations using any of the procedures and devices discussed above relative to FIGS. 1A-3. The concepts discussed here encompass examples of the station 100 utilizing any digital transceivers sufficient to support messaging service communications of recommendations and data communications with the application store 20 that conform to current or future developed digital wireless communication standards. Although not shown, the mobile station may include other transceivers, for alternate digital protocols and/or for a legacy analog protocol for voice calls and SMS messaging in instances where a local network may not support digital communications.

The station 100 includes a display 118 for displaying messages, menus or the like, call related information dialed by the user, calling party numbers, Internet, Intranet or mobile network sites, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during interaction with the application store 20, download of mobile station content items, or other related operations discussed herein. Various combinations of the keypad 120, display 118, microphone 102 and speaker 104 may be used as the physical input output elements of the GUI, for multimedia (e.g. audio and/or video) communications. Of course, other user interface elements may be used, such as a stylus and touch sensitive display screen, as in a PDA or smart phone.

A microprocessor 112 serves as a programmable controller for the wireless device 100, in that it controls all operations of the wireless device 100 in accord with programming that it executes, for all normal operations, and for operations involved in the method for offering recommendations to users described herein. In the example shown in FIG. 4, the wireless device 100 includes non-volatile memory, for example, flash type program memory 114, for storage of various "software" or "firmware" program routines and mobile configuration settings, and users' contact lists. The wireless device 100 may also include a non-volatile random access memory (RAM) 116 for a working data processing memory. The wireless device 100 may also include a removable memory, for example, a UICC smartcard (not shown). Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. For example, programming may include instructions for accessing and downloading a user's contact list from the mobile device. In addition, it may include the client application for managing and/or accessing the application store 20. The programming may also include applications downloaded from the application store 20.

Of note for purposes of this discussion, the information stored in the memory 114 may include a client program that allows the user to operate the mobile station 100 to access the application store and browse the available content items in the store catalog. The client program may be enhanced to facilitate aspects of the content recommendations and associated incentive program, for example, to maintain a local record of recommendations, rewards and incentive/credit redemption for off-line presentation to the user, so that the user need not always use the network data service to access the store 20 to view relevant information.

As shown by the above discussion, functions relating to incentivized recommendations of applications or other mobile station content items may be implemented on computers connected for data communication via the components of a network, operating as the various servers and/or client mobile devices as shown in FIGS. 1A to 3. Although special purpose devices may be used, the server devices may be implemented using one or more hardware platforms intended to represent a general class of data processing device commonly used to run "server" alone or in combination with "client" programming in the mobile devices, so as to implement the content recommendation related functions discussed above.

Figure 5:
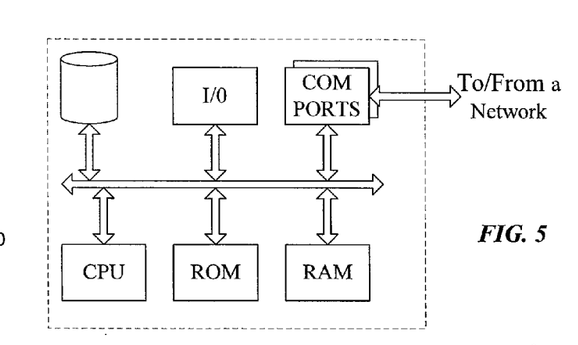
FIG. 5 is a simplified functional block diagram of a computer that may be configured as a host or server.
Figure 6:
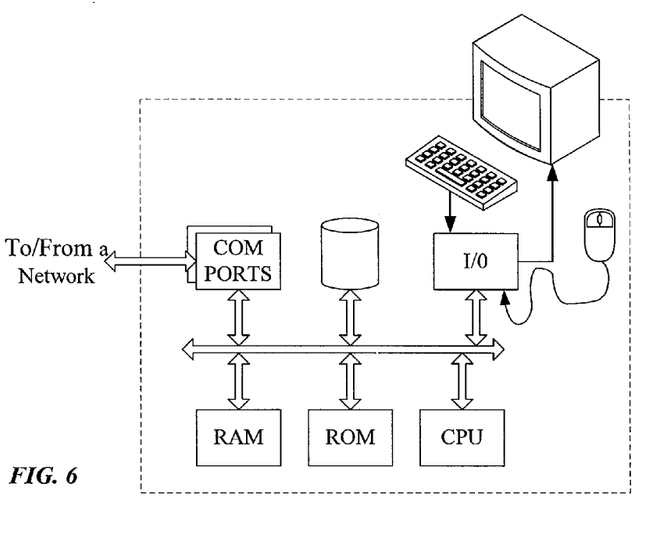
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

As known in the data processing and communications arts, a general-purpose computer may include a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various friend databases and content relating to downloadable applications available via the application store 20. The software code is executable by the general-purpose computer that functions as the server and/or that functions as a client device. In operation, the code is stored within the general-purpose computer platform. At other times, however, the software may be stored at other locations and/or transported for loading into the appropriate general-purpose computer system. Execution of such code by a processor or central proceeding unit of the computer platform enables the platform to implement the technique for the incentivized method for offering recommendations to users for selection and purchase of mobile content items, in essentially the manner performed in the implementations discussed and illustrated herein.

A server, for example, includes a data communication interface for packet data communication. The server also includes a central processing unit (CPU), in the form of one or more processors, for executing program instructions. The server platform may include an internal communication bus, program storage and data storage for various data files to be processed and/or communicated by the server, although the server often receives programming and data via network communications. The hardware elements, operating systems and programming languages of such servers and client devices are conventional in nature, and it is presumed that those skilled in the art are adequately familiar therewith. Of course, the server functions may be implemented in a distributed fashion on a number of similar platforms, to distribute the processing load.

Hence, aspects of the present recommendation method outlined above may be embodied in programming. Program aspects of the technology may be thought of as "products" or "articles of manufacture" may be in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer (s) or the like, such as may be used to implement the social network method, etc. shown in the drawings. Volatile storage media include dynamic memory, such as main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

BS—Base Station
BTS—Base Transceiver System
CD-ROM—Compact Disc Read Only Memory
CPU—Central Processing Unit
DVD—Digital Video Disc
DVD-ROM—Digital Video Disc Read Only Memory
EEPROM—Electrically Erasable Programmable Read Only Memory
EMS—Enhanced Messaging Service
EPROM—Erasable Programmable Read Only Memory
FLASH-EPROM—Flash Erasable Programmable Read Only Memory
GUI—Graphical User Interface
IP—Internet Protocol
IR—Infrared
MMS—Multimedia Messaging Service
PC—Personal Computer
PDA—Personal Digital Assistant
PROM—Programmable Read Only Memory
PSTN—Public Switched Telephone Network
RAM—Random Access Memory
RAN—Random Access Network
ROM—Read Only Memory
RF—Radio Frequency
SMS—Short Messaging Service
UICC—Universal Integrated Circuit Card
WAN—Wide Area Network
XCVR—Digital Transceiver

What is claimed is:

1. A method comprising steps of:
  distributing a recommendation of a mobile station content item, from a first user of a first mobile station, through a mobile communication network to a second mobile station of a second user;
  storing information identifying the recommended mobile station content item and the second user in a record of a user recommendation table associated with the first user, the user recommendation table stored in a non-transitory storage device;
  detecting, by a processor, access of the recommended mobile station content item by the second mobile station of the second user; and
  responsive to the detected access:
    identifying, by the processor, the first user from the stored information in the user recommendation table;
    identifying, by the processor, a reward value associated with the recommended mobile station content item based on an application content description table, the application content description table stored in the non-transitory storage device; and
    applying, by the processor, the reward value to a recommendation credit balance of the first user stored in a user account tracking table on the non-transitory storage device, to provide a reward to the first user of the first mobile station, wherein providing the reward comprises:
    detecting access of a further mobile station content item by the first mobile station of the first user;
    responsive to the detected access of the further mobile station content item, providing the user with options for accepting the recommendation credit balance, the options including receiving a coupon, a rebate, or a discount on the price of the further mobile station content item; and
    redeeming the recommendation credit balance according to a selected one of the options.

2. The method of claim 1, wherein before the distributing step, the method comprises offering the reward to the first user of the first mobile station as an incentive to recommend one or more content items to one or more other mobile station users.

3. The method of claim 1, further comprising steps of:
    distributing a recommendation of the mobile station content item, from the second user of the second mobile station, through the mobile communication network to a third mobile station of a third user;
    storing information identifying the recommended mobile station content item and the third user in a record of the user recommendation table associated with the second user;
    storing information identifying the recommended mobile station content item and the third user in the record of the user recommendation table associated with the first user;
    detecting access of the recommended mobile station content item by the third mobile station of the third user; and
    responsive to the detected access by the third mobile station of the third user, providing a further reward to the first user of the first mobile station and providing a reward to the second user of the second mobile station, for the detected access by the third mobile station of the third user.

4. The method of claim 1, further comprising the step of:
    storing information identifying the recommendation credit balance of the first user in the account tracking table.

5. The method of claim 4, wherein providing the reward comprises:
    responsive to the detected access of the further mobile station content, discounting a price of the further mobile station content item by the recommendation credit balance.

6. A method comprising steps of:
    receiving at a server from a first user of a first mobile station, a message identifying a mobile station content item and a second user of a second mobile station to whom the first user of the first mobile station intends to recommend the mobile station content item;
    storing information identifying the recommended mobile station content item and the second user in a record of a user recommendation table associated with the first user, the user recommendation table stored in a non-transitory storage device;
    sending a mobile station messaging service message, containing a recommendation of the mobile station content item from the first user, through a mobile communication network to the second mobile station of the second user;
    detecting, by a processor, access of the recommended mobile station content item by the second mobile station of the second user; and
    responsive to the detected access:
        identifying, by the processor, the first user from the stored information in the user recommendation table;
        identifying, by the processor, a reward value associated with the recommended mobile station content item based on an application content description table, the application content description table stored in the non-transitory storage device; and
        applying, by the processor, the reward value to a recommendation credit balance of the first user stored in a user account tracking table on the non-transitory storage device, to provide a reward to the first user of the first mobile station,
    wherein providing the reward comprises:
        detecting access of a further mobile station content item by the first mobile station of the first user;
        responsive to the detected access of the further mobile station content item, providing the user with options for accepting the recommendation credit balance, the options including receiving a coupon, a rebate, or a discount on the price of the further mobile station content item; and
        redeeming the recommendation credit balance according to a selected one of the options.

7. The method of claim 6, wherein the mobile station messaging service message conforms to a protocol selected from the group consisting of: short messaging service (SMS), enhanced messaging service (EMS), and multimedia messaging service (MMS).

8. The method of claim 6, wherein the mobile station messaging service message identifies the first user and contains a link to the recommended mobile station content item.

9. The method of claim 6, further comprising steps of:
    receiving at the server from the second mobile station of the second user, a message identifying the mobile station content item and a third user of a third mobile station to whom the second user of the second mobile station intends to recommend the mobile station content item;
    storing information identifying the recommended mobile station content item and the third user in a record of the user recommendation table associated with the second user;
    sending a further mobile station messaging service message, containing a recommendation of the mobile station content item from the second user, through a mobile communication network to the third mobile station of the third user;
    detecting access of the recommended mobile station content item by the third mobile station of the third user; and
    responsive to the detected access by the third mobile station of the third user, providing a further reward to the user of the first mobile station and providing a reward to the second user of the second mobile station, for the detected access by the third mobile station of the third user.

10. The method of claim 6, further comprising the step of:
    storing information identifying the recommendation credit balance of the first user in the account tracking table.

11. The method of claim 10, wherein providing the reward comprises:
    responsive to the detected access of the further mobile station content, discounting a price of the further mobile station content item by the recommendation credit balance.

12. The method of claim 10, further comprising the step of:
    sending a further mobile station messaging service message, containing an indication of the recommendation credit balance, through the mobile communication network to the first mobile station of the first user.

13. A system comprising at least one server, the at least one server comprising:
an interface for communication with mobile stations through a mobile communication network;
a processor for controlling operations of the at least one server, including communications through the interface;
storage for user records and programming executable by the processor, wherein the programming configures the processor so that the system is capable of implementing functions including functions to:
receive from a first user of a first mobile station, a message identifying a mobile station content item and a second user of a second mobile station to whom the first user of the first mobile station intends to recommend the mobile station content item;
store information identifying the recommended mobile station content item and the second user in a record of a user recommendation table associated with the first user, in the storage;
send a mobile station messaging service message, containing a recommendation of the mobile station content item from the first user, through the mobile communication network to the second mobile station of the second user;
detect access of the recommended mobile station content item by the second mobile station of the second user; and
responsive to the detected access:
identify the first user from the stored information in the user recommendation table;
identify a reward value associated with the recommended mobile station content item based on an application content description table in the storage; and
apply the reward value to a recommendation credit balance of the first user stored in a user account tracking table in the storage, to provide a reward to the first user of the first mobile station,
wherein in providing the reward, the processor is configured to implement functions to:
detect access of a further mobile station content item by the first mobile station of the first user;
responsive to the detected access of the further mobile station content, provide the user with options for accepting the recommendation credit balance, the options including receiving a coupon, a rebate, or a discount on the price of the further mobile station content item; and
redeem the recommendation credit balance according to a selected one of the options.

14. The system of claim 13, wherein the user recommendation table associates the recommendation from the first user with an identifying number for the first user and an identifying number for the second user.

15. The system of claim 14, wherein the application content description table contains information about the recommended mobile station content item.

16. The system of claim 15, wherein the information about the recommended mobile station content item comprises a price and the reward value.

17. The system of claim 15, wherein the user account tracking table references the user recommendation table and the application content description table and stores the recommendation credit balance.

18. The system of claim 17, wherein the system is capable of implementing functions including functions to:
responsive to the detected access of the further mobile station content, discount a price of the second mobile station content item by the recommendation credit balance.

* * * * *